United States Patent
Lopez et al.

(10) Patent No.: US 12,056,829 B2
(45) Date of Patent: Aug. 6, 2024

(54) CORE MODEL AUGMENTED REALITY

(71) Applicant: Equinor Energy AS, Stavanger (NO)

(72) Inventors: Olivier Lopez, Trondheim (NO); Beate Louise Stølen Olsen, Saksvik (NO); Kjell Einar Mikkelsen, Trondheim (NO); Georgy Ushakov, Tiller (NO)

(73) Assignee: EQUINOR ENERGY AS, Stavanger (NO)

( * ) Notice: Subject to any disclaimer, the term of this patent is extended or adjusted under 35 U.S.C. 154(b) by 98 days.

(21) Appl. No.: 17/788,045

(22) PCT Filed: Dec. 21, 2020

(86) PCT No.: PCT/NO2020/050324
§ 371 (c)(1),
(2) Date: Jun. 22, 2022

(87) PCT Pub. No.: WO2021/133175
PCT Pub. Date: Jul. 1, 2021

(65) Prior Publication Data
US 2023/0038924 A1    Feb. 9, 2023

(30) Foreign Application Priority Data

Dec. 23, 2019  (GB) ..................... 1919207

(51) Int. Cl.
*G06T 19/00*  (2011.01)
*G06T 7/20*   (2017.01)
(Continued)

(52) U.S. Cl.
CPC ............. *G06T 19/006* (2013.01); *G06T 7/20* (2013.01); *G06F 3/02* (2013.01); *G06F 3/0488* (2013.01);
(Continued)

(58) Field of Classification Search
CPC .................... G06T 7/20; G06T 19/006; G06T 2207/30181; G06T 2219/004;
(Continued)

(56) References Cited

U.S. PATENT DOCUMENTS 4,149,804 A   4/1979  Chew, III
6,823,298 B1  11/2004 Jones et al.
(Continued)

FOREIGN PATENT DOCUMENTS

CN          106296678 A    1/2017
WO     WO 2008/100614 A1   8/2008

OTHER PUBLICATIONS

Betlem, "Digital drill core models: Characterising and storing samples from Svalbard", #SINTEFblog, Feb. 13, 2020, available at https://blog.sintef.com/sintefenergy/ccs/digital-drill-core-models-characterising-and-storing-samples-from-svalbard/.

(Continued)

*Primary Examiner* — Xilin Guo
(74) *Attorney, Agent, or Firm* — Birch, Stewart, Kolasch & Birch, LLP

(57) ABSTRACT

A method of registering geological data at a formation core tracking system includes, at the tracking system, registering a formation core provided within a field of view of an optical imaging system of the tracking system; tracking the orientation of the formation core relative to the tracking system and the distance of the formation core relative to the tracking system; obtaining data associated with a first section of the formation core which is located at a predetermined distance from the tracking system, displaying the data together with an image of the formation core such that an augmented reality image is provided on a display device of the tracking system, changing the distance between the tracking system and the core; and updating the displayed data by obtaining (Continued)

Figure 1:
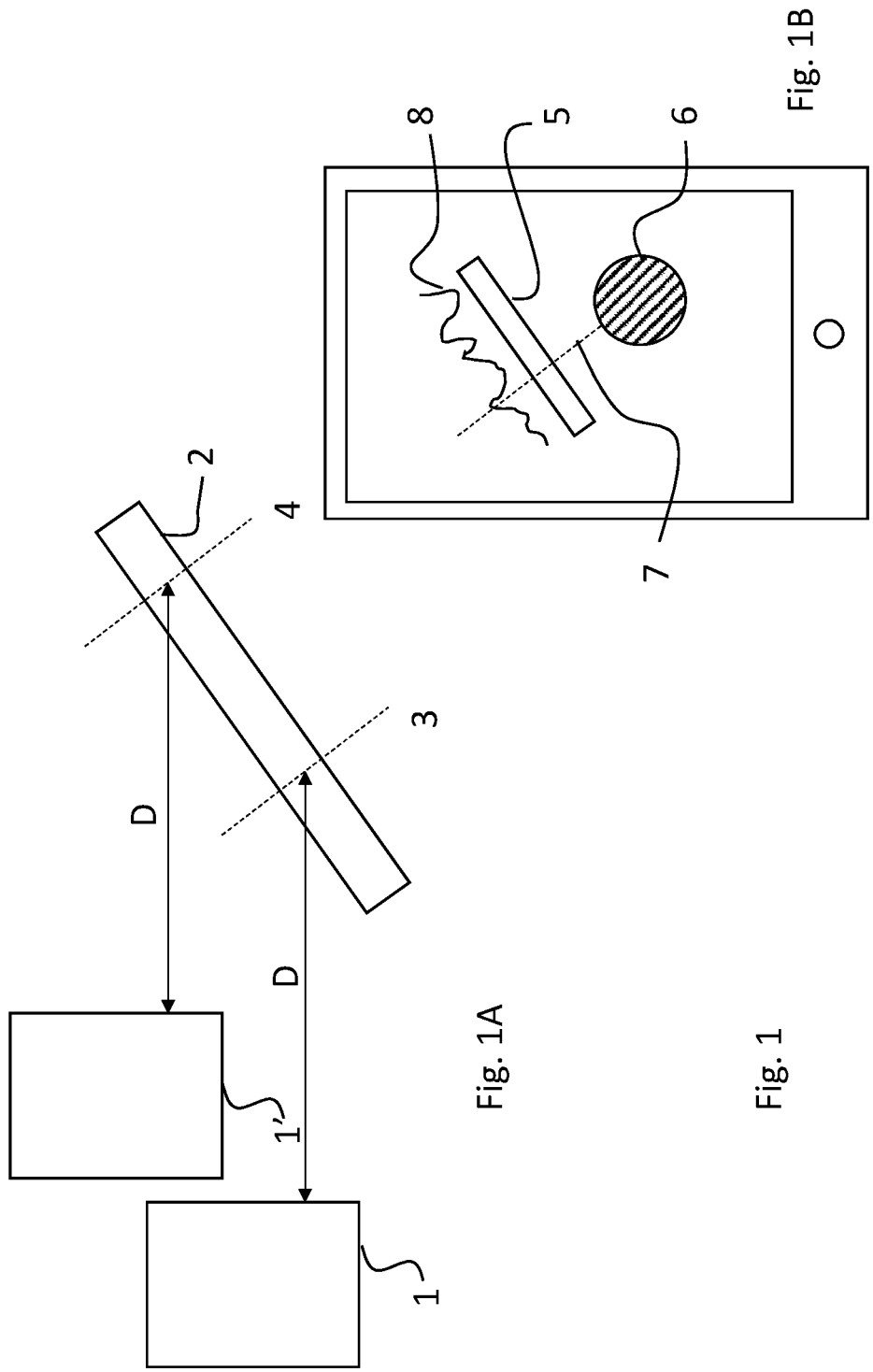

data associated with a second section of the formation core which is located at said predetermined distance from the tracking system.

24 Claims, 4 Drawing Sheets

(51) Int. Cl.
*G06F 3/02* (2006.01)
*G06F 3/0488* (2022.01)

(52) U.S. Cl.
CPC .............. *G06T 2207/30181* (2013.01); *G06T 2219/004* (2013.01); *G06T 2219/2004* (2013.01)

(58) Field of Classification Search
CPC ... G06T 2219/2004; G06T 2207/10081; G06T 7/0004; G06T 2207/30108; G01V 1/34; G01V 11/00; G01V 2210/74; G01V 2210/6169; G01V 3/32; G01V 20/00; G06F 3/0488; G06F 3/02; G06F 30/20; G06F 18/00
See application file for complete search history.

(56) References Cited

U.S. PATENT DOCUMENTS

| | | | | |
|---|---|---|---|---|
| 8,889,414 | B2* | 11/2014 | Alivisatos | G01N 33/5005 |
| | | | | 435/395 |
| 2007/0162264 | A1* | 7/2007 | Jones | G01N 33/241 |
| | | | | 703/2 |
| 2012/0076364 | A1* | 3/2012 | Tjhang | E21B 47/002 |
| | | | | 382/109 |
| 2015/0304552 | A1* | 10/2015 | Matsuzaki | G02B 21/18 |
| | | | | 348/80 |
| 2018/0122143 | A1* | 5/2018 | Ellwood, Jr. | G02B 5/30 |
| 2022/0133284 | A1* | 5/2022 | Lampotang | A61B 34/20 |
| | | | | 600/562 |

OTHER PUBLICATIONS

International Search Report, issued in PCT/NO2020/050324, dated Mar. 19, 2021.
United Kingdom Examination Report and Notification of Intention to Grant under Section 18(4), issued in Priority Application No. 1919207.9, dated Oct. 11, 2021.
United Kingdom Search Report, issued in Priority Application No. 1919207.9, dated Jun. 4, 2020.
Written Opinion of the International Searching Authority, issued in PCT/NO2020/050324, dated Mar. 19, 2021.
Bane et al., "Interactive Tools for Virtual X-Ray Vision in Mobile Augmented Reality," Proceedings of the Three IEEE and ACM International Sumposium on Mixed and Augmented Reality (ISMAR 2004), IEEE Computer Society, Nov. 2, 2004, pp. 1-9.
Extended European Search Report for European Application No. 20904599.6, dated Jun. 2, 2023.
Issartel et al., "Slicing Techniques for handheld Augmented Reality," IEEE Symposium on 3D User Interfaces, Mar. 29-30, 2014, pp. 39-42.
Stinchman, "Sketching up the world: In situ authoring for mobile Augmented Reality," retrieved from the Internet: URL: http://www.youtube.com/watch?v=TjUwRIRzCus, published Jan. 12, 2012.

* cited by examiner

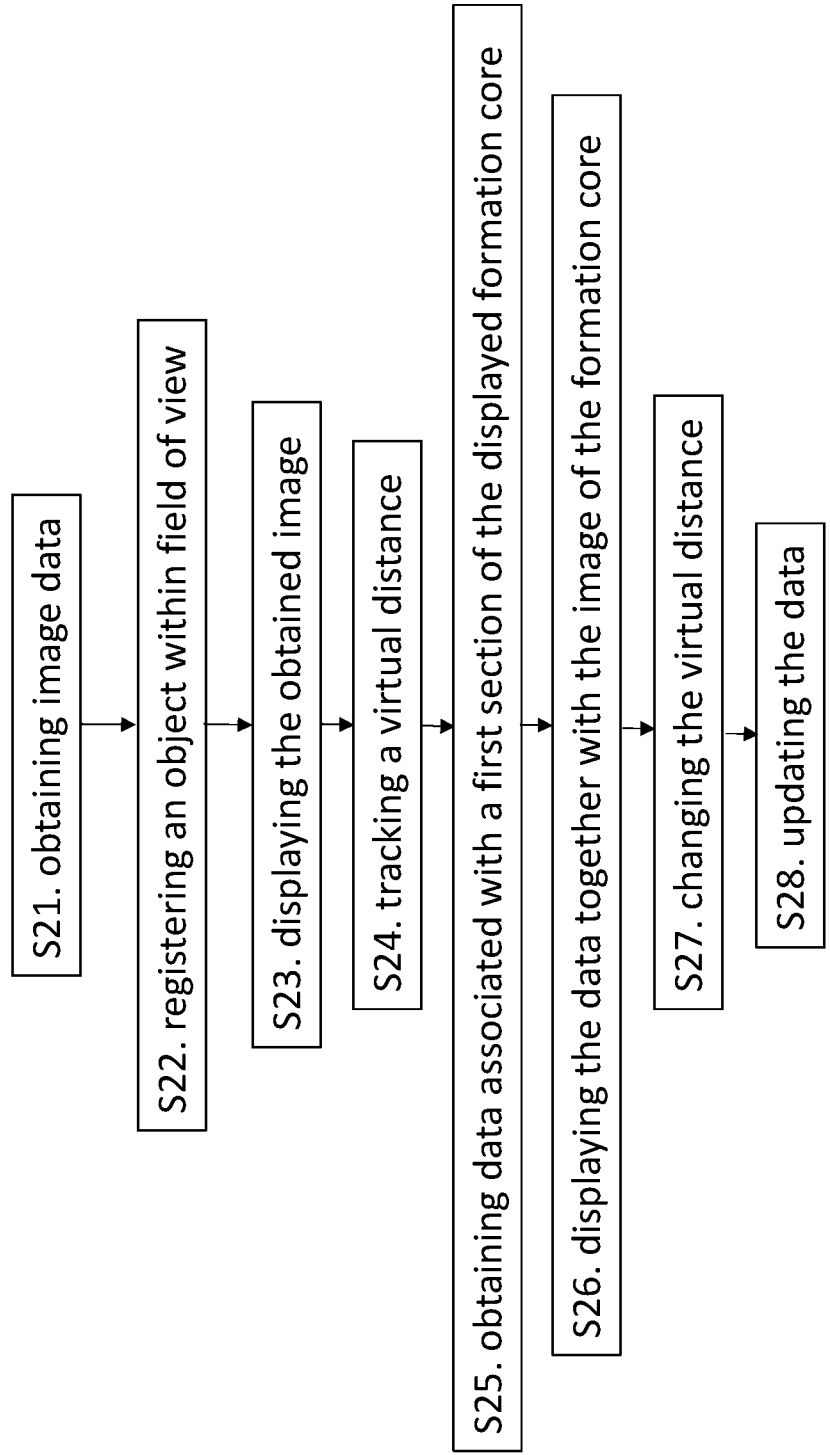

CORE MODEL AUGMENTED REALITY

FIELD OF THE INVENTION

The invention relates to the analysis of rock formation, and more specifically to analysing rock samples with augmented reality technology.

BACKGROUND

Geological rock formations are explored in a variety of ways to gain knowledge about their physical structure. Data can be gathered by carrying out acoustic or electromagnetic surveys. It is also possible to collect a sample of the formation by using a core drill, which is typically a hollow steel tube terminating at a cutting edge. The core drill is rotated to enter the rock formation and a core is captured within the core drill. After recovering the core drill from the formation, the core can be recovered and analysed in a laboratory. The results of analysing the core can help in identifying the presence of hydrocarbons and in understanding reservoir properties.

STATEMENT OF INVENTION

According to a first aspect of the invention, there is provided a method of registering geological data at a formation core tracking system, the method comprising: at the tracking system, obtaining image data of a formation core to be displayed on a display device of the tracking system; registering an object provided within a field of view of an optical imaging system of the tracking system; displaying the obtained image of the formation core with respect to the registered object such that an augmented reality image is provided on the display device of the tracking system; tracking a virtual distance between the displayed formation core and the tracking system; obtaining data associated with a first section of the displayed formation core which is located at a predetermined virtual distance from the tracking system; displaying the data together with the image of the formation core on the display; changing the virtual distance between the tracking system and the displayed formation core; updating the data by obtaining data associated with a second section of the formation core which is located at the predetermined virtual distance from the tracking system.

The object may be a planar object, such as a table or a wall.

Said obtaining image data may be carried out by retrieving image data from a remote storage location, or by registering a formation core provided within the field of view of the optical imaging system of the tracking system.

The step of tracking a virtual distance may be based on tracking the distance between the tracking system and at least part the object.

The predetermined virtual distance may be equal to the focal length of the optical imaging system, and/or the predetermined virtual distance may be in the range of 50 cm to 2 m.

The step of registering the object may comprise identifying an object with a planar surface, along the orientation axes of the tracking system, within an image collected by the optical imaging system.

A misorientation angle between orientation axes of the tracking system and orientation axes of the displayed formation core may be less than 10 degrees, more preferably less than 1 degree.

The data may comprise one or more of: gamma ray logs (GR) measuring naturally occurring gamma radiation along the length of the borehole for formation evaluation, density logs (DEN) measuring continuous record of a formation's bulk density along the length of a borehole, neutron logs (NEU), measuring the amount of scattered neutrons to evaluate formation porosity; log depth; depth of the formation from which the formation core is retrieved; porosity, POR; horizontal and/or vertical permeability; stratigraphic columns representing the groups and the formations; seismic marker; bio-stratigraphic columns; core photos in white light or UV-light; grain sieve analyse data as grain-size distribution logs; bars indicating Wentworth scale; intervals with facies associated with the depth of the section; tadpoles of dip-meter data and paleo-current measurements; image logs as slabs or as an unrolled cylinder; Xrd, mineralogical, data; acoustic log data; core descriptions; lithology data; resistivity data; porosity data; seismic impedance; or a synthetic seismogram.

The image of the data may be locked together with the displayed formation core on the display device, or the image of the data may be saved together with the displayed formation core such as to produce an augmented reality image.

The image may be annotated by entering data with a keyboard or a touch screen provided at the tracking device.

According to a second aspect of the invention there is provide a method of registering geological data at a formation core tracking system, the method comprising: at the tracking system, registering a formation core provided within a field of view of an optical imaging system of the tracking system; tracking the orientation of the formation core relative to the tracking system and the distance of the formation core relative to the tracking system; obtaining data associated with a first section of the formation core which is located at a predetermined distance from the tracking system, displaying the data together with an image of the formation core such that an augmented reality image is provided on a display device of the tracking system, changing the distance between the tracking system and the core; and updating the displayed data by obtaining data associated with a second section of the formation core which is located at said predetermined distance from the tracking system.

The distance of the formation core relative to the tracking system can be tracked while the core is in the field of view of the optical imaging system. The predetermined distance is set in advance and can be fixed during use, while the relative distance depends on the relative position of the tracking system and the formation core.

The step of registering a formation core may comprise imaging a code provided adjacent or on the core and reading the code with a processor of the tracking system. For example, the code comprises one or more of: text comprising numbers and/or letters, a bar-code or a QR code. The code enables automated identification of the core and identifying corresponding data stored on the tracking device or on a remote memory. Alternatively, the user may enter information identifying the core and find the corresponding data.

The step of registering may further comprise identifying the formation core within an image collected by the optical imaging system.

The step of tracking may further comprise identifying the formation core within an image collected by the optical imaging system during movement of the formation core with respect to the tracking system.

The data may comprise one or more of:
gamma ray logs (GR) measuring naturally occurring gamma radiation along the length of the borehole for formation evaluation,
density logs (DEN) measuring continuous record of a formation's bulk density along the length of a borehole,
neutron logs (NEU), measuring the amount of scattered neutrons to evaluate formation porosity;
log depth;
depth of the formation from which the formation core is retrieved;
porosity, POR;
horizontal and/or vertical permeability;
stratigraphic columns representing the groups and the formations;
seismic marker;
bio-stratigraphic columns;
core photos in white light or UV-light;
grain sieve analyse data as grain-size distribution logs;
bars indicating Wentworth scale;
intervals with facies associated with the depth of the section;
tadpoles of dip-meter data and paleo-current measurements;
image logs as slabs or as an unrolled cylinder;
Xrd, mineralogical, data;
acoustic log data;
core descriptions;
lithology data;
resistivity data;
porosity data;
seismic impedance; or
synthetic seismogram.

An optional further step is locking the image of the data together with an image of the formation core on the display device, or saving the image of the data together with an image of the formation core.

The method may further comprise annotating the image by entering data with a keyboard or a touch screen provided at the tracking device.

The core may be a cylindrical sample of a subsurface formation or a slice of a formation comprising two substantially flat parallel outer surfaces, but other shapes of a geological sample are also possible. It is common practice to cut a cylindrical sample longitudinally in multiple samples, for example two or three samples or 'slabs'. The smooth and flat surfaces of the slabs are easier to examine when compared to the rough cylindrical outer surface of the original core.

The predetermined distance may be in the range of 50 cm to 2 m, which is advantageous during normal use.

The step of obtaining data may comprise obtaining data from a local memory of the tracking system or from a remote data storage device.

According to a third aspect of the invention there is provided a tracking system comprising a processor arranged to carry out the method according to the first or second aspect.

According to a fourth aspect of the invention there is provided a computer program product comprising program instructions operative, when performed by a processor, to cause the processor to perform a method according to the first or second aspect.

FIGURES

Figure 2:
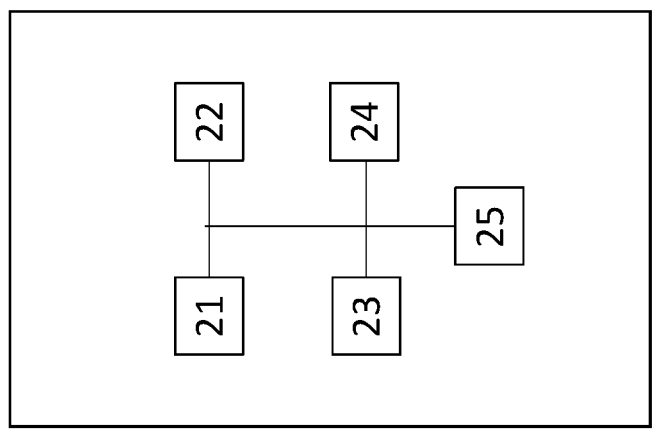
Figure 3:
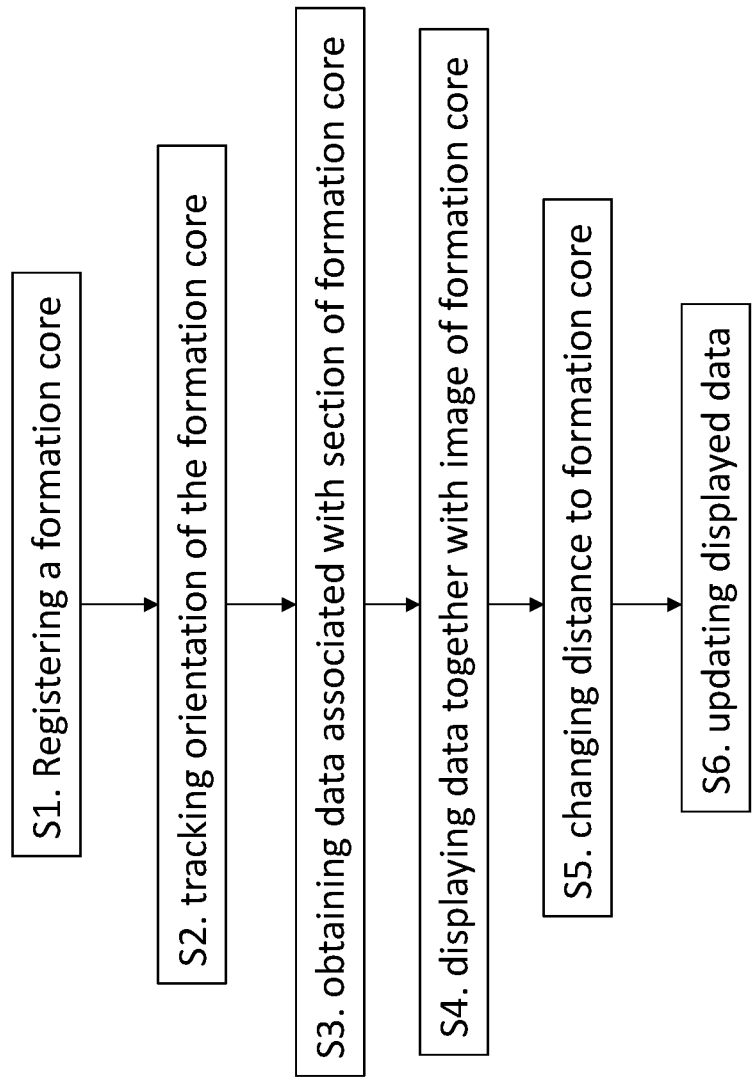

Some embodiments of the invention will now be described by way of example only and with reference to the accompanying drawings, in which:

FIG. 1 is schematic diagram of a device and a core;
FIG. 2 is a schematic diagram of a device;
FIG. 3 is a flow chart of a method; and
FIG. 4 is a flow chart of a method.

SPECIFIC DESCRIPTION

The inventors have realised that a core can be explored more efficiently using image capturing and processing in combination with selecting data related to the core from a database. A tracking system can be used, which includes an imaging system such as a camera, a display and a data processor. The core is placed in the field of view of the optical imaging system of the tracking system. The tracking system then tracks the orientation of the formation core relative to the tracking system and the distance of the formation core relative to the tracking system using known augmented reality tracking techniques. The object, in this case the core, can be tracked or followed as it moves relative to the camera as long as the object is within the field of view of the camera. The core is displayed on a display of the tracking device while it is being tracked by the tracking device.

The expression 'core' is used herein and refers to a sample of the formation in general. The core may be a cylindrical sample of the formation obtained by a hollow drill, or may be a slice of such cylindrical sample. In an exemplary scenario, a cylindrical sample is segmented in portions of around 1 m and sliced in the longitudinal direction to obtain a large set of slices which can be studied.

Advantageously, the core data can be compared to data from the collection of cores to establish correlations between the data on display and the data in the collection of cores. Corresponding core data may be shown on the display for comparison. In the event that the stratigraphic layers are named, such names can also be displayed for convenience and other available information related to the layers can be displayed.

The tracking system is further arranged to obtaining data associated with the core. The core typically takes the form of a longitudinal solid body and different positions along the longitudinal direction correspond to different depths of the formation from which the core has been retrieved because the core is typically retrieved in a generally vertical direction. The different depths therefore often also correspond to different ages of the formation. Although geological formations sometimes move sideways or even upside-down over time, a deeper layer of the formation often corresponds to an older part of the formation. Regardless of the age of the formation, different positions along the core will have their own unique characteristics. The tracking system is arranged to display characteristics of a section of the core, for example characteristics of a slice in the transverse direction of the core at a predetermined distance from the tracking system.

The distance between the tracking system and the core is registered by the tracking system. If the distance is varied, characteristics of a different section of the core are displayed. The user can therefore 'slice through' the core by moving the distance between the core and the tracking system.

By way of a specific example of a use scenario, a core is displayed on a table and the tracking system is a tablet held by a user with a camera of the tablet pointing at the core. A predetermined distance of 1 metre may be preset in the device or set by a user, and specific data of a 'slice' of the core at 1 metre from the tablet device are displayed on a screen of the tablet. When the user moves the tablet with respect to the stationary core on the table, a different slice is selected because the 1 metre distance will correspond to a different portion of the core. If no core portion is present at the 1 metre distance, then an error message may be displayed or a hint to the user to move closer to the core or further away from the core in order to bring a specific core portion within the 1 metre predetermined distance. Alongside the data a real-time image of the core itself (without modification) is displayed.

Examples of hand-held tracking systems are smartphones or tablet computing devices, and those devices can be moved by hand while pointing the camera at the core which is displayed at a fixed location. At the display of the tracking system, the core is displayed along with data of a specific section of the core. When the device is moved, data corresponding to a different section of the core are displayed. If the different sections of the core correspond to different depths, or different ages of the formation, the user can therefore travel through the different depths or ages by moving the tracking system along the core.

It is not unusual to have a large collection of cores from different formations. Also for a core from a single drilling location the core will be displayed in a plurality of different sections. It is therefore necessary to distinguish between different cores or different sections of core. The different sections may be recognised by AI software, or alternatively a code is provided adjacent or on the core to indicate which core is displayed. Examples of the code are text comprising numbers and/or letters, a bar-code or a QR code.

The tracking device is arranged to recognise which core is in the field of view with the help of the code and further to recognise the shape of the core to enable tracking of the image while the tracking device moves. The distance to the different parts of the core is also tracked such that when the relative distance changes, a data for a different section can be displayed.

Examples of data which can be displayed are: GR logs, DEN logs Neu logs, log depth, depth of the formation from which the formation core is retrieved, porosity POR, and horizontal and vertical permeability, stratigraphic columns representing the groups and the formations, seismic markers, bio-stratigraphic columns, core photos in white light or UV-light, grain sieve analyse data as grain-size distribution logs, bars indicating Wentworth scale, intervals with facies associated with the depth of the section, tadpoles of dipmeter data and paleo-current measurements, image logs as slabs or as an unrolled cylinder, Xrd (mineralogical) data, acoustic log data, core descriptions, lithology data, resistivity data, porosity data, seismic impedance, synthetic seismogram.

Below are some definitions of geological expressions used herein. These expressions are known to the skilled person as such and may also be found in sources such as Wikipedia or Collins Dictionary of Geology.

Stratigraphic column: vertical succession of sedimentary rocks at the location of the well Chronostratigraphic column: stratigraphic column where the sedimentary rocks are stacked in relation to age Biostratigraphic column: stratigraphic column where the rock strata is assigned relative ages by using the fossil assemblages contained within them Seismic markers: boundary between rocks of differing density and/or different elastic properties, at which the velocities of seismic waves change abruptly Seismic impedance: The concept of acoustic (or seismic) impedance is critical to understanding seismic reflectivity. Seismic impedance controls the seismic reflection process in the sense that seismic energy is reflected only at rock interfaces in which there are changes in impedance across the interface. Seismic impedance is defined as $I=pV$, where $I$=impedance, $p$=the bulk density of the rock, and $V$=the velocity of seismic wave propagation through the rock.

Synthetic seismogram: a seismic trace created from sonic and density logs and it is used to compare the original seismic data collected near the well location Core photos in white and UV-light: Core photos are made from the slabbed core. Normally both white light (normal light conditions) and UV (Ultra Violet) photos are taken. UV-light is used to locate fluorescent minerals and hydrocarbons. A critical step in recording the presence of hydrocarbons in petroleum cores and locating fluid contacts Grain size: is the diameter of individual grains of sediment, or the lithified particles in clastic rocks.

Wentworth grade scale: a scale to measure the grain size of sedimentary rocks

Facies: an assemblage or association of mineral, rock, or fossil features reflecting the environment and conditions of origin of the rock.

Dip data: the angle in degrees between a horizontal plane and an inclined earth feature such as a rock stratum Strike data: the direction taken by a structural surface or bedding plane as it intersects the horizontal; it is the compass direction of the horizontal line in an inclined plane Palaeocurrents: currents of water or wind, active in geological past, whose direction can be inferred from sedimentary structures such as cross-bedding, ripple marks and striations XRD data: X-ray diffraction waves used as a method for identifying minerals Core descriptions: an important early work task in any subsurface evaluation as it captures hard data from the reservoir rocks themselves and enables the geologist to 'read' and understand primary processes that deposited these rocks and secondary processes that modified them in a later stage Munsell rock colour: The Munsell Rock Color Chart helps geologists communicate with color more effectively by cross-referencing ISCC-NBS color names with unique Munsell alpha-numeric color notations for rock color samples Lithology: the description of the characteristics of rocks on the basis of colour, grain size and composition Advantageously multiple data examples can be shown concurrently. The choice of data to be shown can be changed during use. In addition, data related to the core itself such as measured porosity and horizontal and vertical permeability KLH and KLV respectively can be shown. Log depth and core depth can be displayed for the estimation of core shift being the difference between the calculated log depth and the calculated core depth.

Optional further features are locking the image of the data together with an image of the formation core on the display device, or saving the image of the data together with an image of the formation core. The image may also be annotated by entering data with a keyboard or a touch screen provided at the tracking device.

Further optional features include having depth related data align correctly to the image of the formation core on the display device. Formation picks and key surfaces along the core CT sample in both 2D and 3D can with advantage be shown to determine the core samples position in the stratigraphy.

Once a specific area of interest in the image has been identified, a snapshot of the then currently displayed image can be taken and manipulated. Examples of manipulation can include zooming in or out, or directly commenting on the cores through drawing on the screen is also provided for such. Such annotated images are then stored.

FIG. 1 illustrates schematically the method described herein. A handheld device 1 in FIG. 1A is held at a distance D from a core 2. The distance D may be in the range of 50 cm to 1 m, which would be convenient for a user, but other distances would also work. The distance D determines which slice 3 of the core is selected for obtaining corresponding data. For illustration, it is shown how the device 1' may be moved to a second location whereby the same predetermined distance D now selects a new slice 4 of the core 2. The inset FIG. 1B illustrates the device with a display showing a real-time image 5 of the core 2, obtained with a camera of the device. A cross section 6 with data such as porosity is displayed for slice 7. Additional data 8 such as permeability is shown along the length of the image 5 of the core 2. An augmented reality image is thereby provided and the tablet device updates the data as the tablet device is moved with respect to the core.

FIG. 2 shows a schematic diagram of the tracking system, which has a non-volatile memory 21, a camera 22, a processor 23, a display 24 which also is a touch screen for the user to control the device, and further a (wireless) communication means 25 for communicating with a network or remote device.

FIG. 3 is a flow diagram with the following steps: S1 registering a formation core, S2 tracking the orientation of the formation core, S3 obtaining data associated with a section of the formation core, S4 displaying data together an image of the formation core, S5 changing the distance to the formation core and S6 updating the displayed data.

FIG. 4 is a flow diagram with the following steps: S21 obtaining image data, S22 registering an object within a field of view, S23 displaying the obtained image, S24 tracking a virtual distance, S25 obtaining data associated with a first section of the displayed formation core, S26 displaying the data together with the image of the formation core, S27 changing the virtual distance, and S28 updating the data.

In some examples, there is provided a method of registering geological data at a formation core tracking system, wherein the actual formation core may not be provided within the field of view of the optical imaging system. The device, comprising the optical imaging system, screen and tracking system, may be able to obtain data stored on a remote server to be displayed on the display device of the tracking system to produce an augmented reality image. For example, a user of the device may select, via a user interface, to view a particular core sample. In some examples, the remote server may be part of a cloud-computing system. The remote server may store raw data of physical data acquired using known experimental techniques.

Examples of raw data which can be displayed are: GR logs, DEN logs Neu logs, log depth, depth of the formation from which the formation core is retrieved, porosity POR, and horizontal and vertical permeability, stratigraphic columns representing the groups and the formations, seismic markers, bio-stratigraphic columns, core photos in white light or UV-light, grain sieve analyse data as grain-size distribution logs, bars indicating Wentworth scale, intervals with facies associated with the depth of the section, tadpoles of dip-meter data and paleo-current measurements, image logs as slabs or as an unrolled cylinder, Xrd (mineralogical) data, acoustic log data, core descriptions, lithology data, resistivity data, porosity data, seismic impedance, synthetic seismogram. Other types of formation information may also be displayed such as sidewall cores.

The raw data may be processed using known cloud computing techniques. In this way, the user may manipulate the displayed augmented reality image and the data processing is off-loaded to the cloud. This reduces lag, improves user experience and enables more technical insights to be gleaned from the data. The user may also display multiple sources of data concurrently and manipulate each independently. For example, the user may slice an augmented reality core sample, zoom in on portions of the augmented reality core sample, or adjust an intensity threshold for each different augmented reality core sample. Systematic corrections may also be applied to the data. For example, a depth shift can be applied to log and stratigraphy data to ensure correct depth alignment. As the skilled reader would appreciate, different types of displayed data may require different types of manipulation.

In some examples, AI software analyses the image data acquired from the optical imaging system in order to register a planar objects within the field of view of the optical imaging system. For example, the AI software may detect the top of a table surface or the floor, wall or ceiling of the room as a planar object. A planar object is an object with at least one planar surface along orientation axes of the tracking system. Image data from the remote server may then be displayed onto the centre or other part of this detected plane. The position of the displayed augmented reality image may be fixed relative to the position of the planar object on which the data is overlaid. Accordingly, as the user moves the device, the position of the augmented reality image relative to the planar object on which it is displayed, remains fixed and the displayed image data moves on the display screen (just as the planar object does). The detected planar object may not necessarily span the entire field of view of the optical imaging system. For example, if the planar object is a table, the augmented reality image of the data may still be displayed on an extrapolated surface of the table across the entire screen of the device.

Alternatively, the AI software analyses image data acquired from the optical imaging system more generally to determine one or more points which can be used for tracking and for anchoring the displayed augmented reality image to. The anchoring enables the position in the displayed augmented reality image to remain the same with respect to the one or more points within the image. The object in the displayed augmented reality image, including a core for example, may therefore also be displayed in the image as if it were suspended in air, instead of being placed on a planar object such as a table.

The software may also track the orientation of the tracking system and display the augmented image in the same orientation. That is, if it is detected that the tracking system is in a horizontal orientation, then the augmented image (e.g., a core sample) is displayed in the same orientation. For example, if the device is held in a horizontal orientation, the image data is displayed in a horizontal orientation. When the image is first displayed, the user may also adjust the orientation. If the device comprises a touch-screen, the orientation may be adjusted using touch screen operations made by the user of the device. Preferably, but not necessarily, the device remains stationary during this process. If the tracking system determines that the device has moved during manual alignment, the augmented image of the data may be redisplayed into the centre of the screen in the adjusted orientation. When displaying more image data from the remote server, each additional image data set may be displayed adjacent to an existing one in the same orientation.

The augmented reality image may comprise one or more markers. The markers may denote annotations made by the user of the device. For example, a comment pertaining to a feature in the displayed data, or a summary of data values for the data set, or a depth value corresponding to the location of the marker in a core sample. The user may annotate the image by entering data with a keyboard or a touch screen provided by the tracking device. Alternatively, the markers may act as a link to further information stored on the remote server. If the user of the device selects the marker, the device may query the remote server to display an image on the device, which represents the marked region. For example, the device may display higher magnification images of the marked region.

The interactive sectioning of the augmented reality core image described above also applies in examples where the formation core is not provided in the field of view of the optical imaging system. However, in these cases, the distance between the tracking system and the augmented image of the core is not represented by a "real" distance, but a "virtual" one because the augmented reality image of the core is not overlaid over a photograph of the core in the field of view. After the image is displayed on the registered planar object to provide an augmented reality image of the core sample on the display device, the virtual distance of the displayed image relative to the tracking system is monitored. The absolute value for the virtual distance may not be calculated, but by tracking the variation of size and position of features within the optical image, the size and distance between objects can be calculated. For example, the planar object could be used for this purpose. As the position of the "virtual" formation core, relative to the planar object on which is it overlaid, is fixed, a virtual distance between the tracking system and the augmented image may also be calculated.

As the virtual distance between the augmented reality image of the core and the tracking system varies, the plane of focus of the image from the optical imaging system changes. If the orientation axes of the tracking system is substantially aligned with the orientation axes of the augmented reality core, then data corresponding to a section of the augmented reality image may be loaded from the remote server and displayed together with the augmented reality core image. Substantially aligned means that the misorientation angle between the orientation axes is less than 10 degrees, more preferably 5 degrees, even more preferably 1 degree. The distance between the tracking system and the plane of focus (i.e., the focal length) may be calculated using known software techniques. In some examples, the virtual distance between the tracking system and the augmented reality core image and the focal length may be equal. In other examples, the two lengths may be offset by an arbitrary amount. Data associated with a section of the augmented reality core image, located at a predetermined distance from the tracking system, may be obtained from the remote server. In some examples, the data associated with the section is displayed offset by an amount from the plane of focus and in other examples; the data associated with the section is displayed within the plane of focus. In the latter, the predetermined distance may correspond to the focal length of the optical imaging system. In both cases, the plane of focus is purely for descriptive purposes and may not be displayed on the display device.

Preferably, but not necessarily, the predetermined distance is greater than the initial virtual distance between the tracking system and the augmented reality core image. The predetermined distance may be between 0.5 metres and 2 metres.

As the virtual distance between the tracking system and the augmented reality core image changes, data associated with a further section of the augmented reality core image, located at a predetermined distance from the tracking system, may be obtained from the remote server. In this way, different slices of core data, corresponding to different portions of the augmented reality core image, can be displayed as the tracking system moves. By using virtual reality techniques to display the core samples, data can be analysed and viewed in any location without requiring physical print outs of core samples. This saves space, paper waste and increases the accessibility of the data manipulation.

After display of the section data, the image of the data together with the image of the formation core may be locked and the user may optionally save the augmented reality image.

In an example, a method for registering geological data at a formation core tracking system is provided. The method may comprise, at the tracking system, obtaining image data of a formation core to be displayed on a display device of the tracking system; registering a planar object provided within a field of view of an optical imaging system of the tracking system; displaying the obtained image of the formation core on the registered planar object such that an augmented reality image is provided on the display device of the tracking system; tracking a virtual distance between the displayed formation core and the tracking system; obtaining data associated with a first section of the displayed formation core which is located at a predetermined distance from the tracking system; displaying the data together with the image of the formation core on the display; changing the virtual distance between the tracking system and the displayed formation core; updating the data by obtaining data associated with a second section of the formation core which is located at the predetermined distance from the tracking system.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of registering geological data at a formation core tracking system, the method comprising: at the tracking system,
    obtaining image data of a formation core to be displayed on a display device of the tracking system;
    registering an object provided within a field of view of an optical imaging system of the tracking system;
    determining a distance between the object and the tracking system;
    displaying the obtained image of the formation core with respect to the registered object such that an augmented reality image is provided on the display device of the tracking system;
    tracking a virtual distance between the displayed formation core and the tracking system according to the distance between the object and the tracking system;

setting a predetermined virtual distance;
obtaining data associated with a first section of the displayed formation core, wherein the first section is located at the predetermined virtual distance from the tracking system;
displaying the data together with the image of the formation core on the display;
changing the virtual distance between the tracking system and the displayed formation core, by changing the relative positioning between said object and said tracking system;
updating the data by obtaining data associated with a second section of the displayed formation core, wherein the second section which is located at the predetermined virtual distance from the tracking system.

2. The method according to claim 1, wherein the object is a planar object.

3. The method according to claim 1, wherein said obtaining image data is carried out by retrieving image data from a remote storage location, or by registering a formation core provided within the field of view of the optical imaging system of the tracking system.

4. The method according to claim 1, wherein the predetermined virtual distance is equal to the focal length of the optical imaging system, and/or the predetermined virtual distance is in the range of 50 cm to 2 m.

5. The method according to claim 1, wherein registering the object comprises identifying an object with a planar surface, along the orientation axes of the tracking system, within an image collected by the optical imaging system.

6. The method according to claim 1, wherein:
a misorientation angle between orientation axes of the tracking system and orientation axes of the displayed formation core is less than 10 degrees, more preferably less than 1 degree.

7. The method according to claim 1, wherein said data comprises one or more of:
gamma ray logs (GR) measuring naturally occurring gamma radiation along the length of the borehole for formation evaluation,
density logs (DEN) measuring continuous record of a formation's bulk density along the length of a borehole,
neutron logs (NEU), measuring the amount of scattered neutrons to evaluate formation porosity;
log depth;
depth of the formation from which the formation core is retrieved;
porosity;
horizontal and/or vertical permeability;
stratigraphic columns representing the groups and the formations;
seismic marker;
bio-stratigraphic columns;
core photos in white light or UV-light;
grain sieve analyse data as grain-size distribution logs;
bars indicating Wentworth scale;
intervals with facies associated with the depth of the section;
tadpoles of dip-meter data and paleo-current measurements;
image logs as slabs or as an unrolled cylinder;
X-ray diffraction, mineralogical, data;
acoustic log data;
core descriptions;
lithology data;
resistivity data;
porosity data;
seismic impedance; or
synthetic seismogram.

8. The method according to claim 1, further comprising locking the image of the data together with the displayed formation core on the display device, or saving the image of the data together with the displayed formation core such as to produce an augmented reality image.

9. The method according to claim 1, further comprising annotating the image by entering data with a keyboard or a touch screen provided at the tracking device.

10. A tracking system comprising a processor arranged to carry out the method of claim 1.

11. A computer program product comprising a non-transitory computer-readable storage medium storing computer-executable program instructions operative, when performed by a processor, to cause the processor to perform a method of claim 1.

12. A method of registering geological data at a formation core tracking system, the method comprising: at the tracking system,
registering a formation core provided within a field of view of an optical imaging system of the tracking system;
tracking an orientation of the formation core relative to orientation axes of the tracking system and tracking a distance between the formation core and the tracking system;
obtaining data associated with a first section of the formation core based on said distance, wherein the first section of the formation core is located at a predetermined distance from the tracking system,
displaying the data together with an image of the formation core such that an augmented reality image is provided on a display device of the tracking system,
changing the distance between the tracking system and the core by changing the relative positioning between the tracking system and the core; and
updating the displayed data by obtaining data associated with a second section of the formation core based on said distance, wherein the second section of the formation core is located at said predetermined distance from the tracking system.

13. The method according to claim 12, wherein said registering a formation core comprises imaging a code provided adjacent or on the core and reading the code with a processor of the tracking system.

14. The method according to claim 13, wherein the code comprises one or more of: text comprising numbers and/or letters, a bar-code or a QR code.

15. The method according to claim 12, wherein registering further comprises identifying the formation core within an image collected by the optical imaging system.

16. The method according to claim 12, wherein said tracking further comprises identifying the formation core within an image collected by the optical imaging system during movement of the formation core with respect to the tracking system.

17. The method according to claim 12, wherein said data comprises one or more of:
gamma ray logs (GR) measuring naturally occurring gamma radiation along the length of the borehole for formation evaluation,
density logs (DEN) measuring continuous record of a formation's bulk density along the length of a borehole,
neutron logs (NEU), measuring the amount of scattered neutrons to evaluate formation porosity;

log depth;
depth of the formation from which the formation core is retrieved;
porosity;
horizontal and/or vertical permeability;
stratigraphic columns representing the groups and the formations;
seismic marker;
bio-stratigraphic columns;
core photos in white light or UV-light;
grain sieve analyse data as grain-size distribution logs;
bars indicating Wentworth scale;
intervals with facies associated with the depth of the section;
tadpoles of dip-meter data and paleo-current measurements;
image logs as slabs or as an unrolled cylinder;
X-ray diffraction, mineralogical, data;
acoustic log data;
core descriptions;
lithology data;
resistivity data;
porosity data;
seismic impedance; or
synthetic seismogram.

18. The method according to claim 12, further comprising locking the image of the data together with an image of the formation core on the display device, or saving the image of the data together with an image of the formation core.

19. The method according to claim 12, further comprising annotating the image by entering data with a keyboard or a touch screen provided at the tracking device.

20. The method according to claim 12, wherein the core is a cylindrical sample of a subsurface formation or a slice of a formation comprising two substantially flat parallel outer surfaces.

21. The method according to claim 12, wherein the predetermined distance is in the range of 50 cm to 2 m.

22. The method according to claim 12, wherein said obtaining data comprises obtaining data from a local memory of the tracking system or from a remote data storage device.

23. A tracking system comprising a processor arranged to carry out the method of claim 11.

24. A computer program product comprising a non-transitory computer-readable storage medium storing computer-executable program instructions operative, when performed by a processor, to cause the processor to perform a method of claim 12.

* * * * *